Patented Nov. 18, 1952

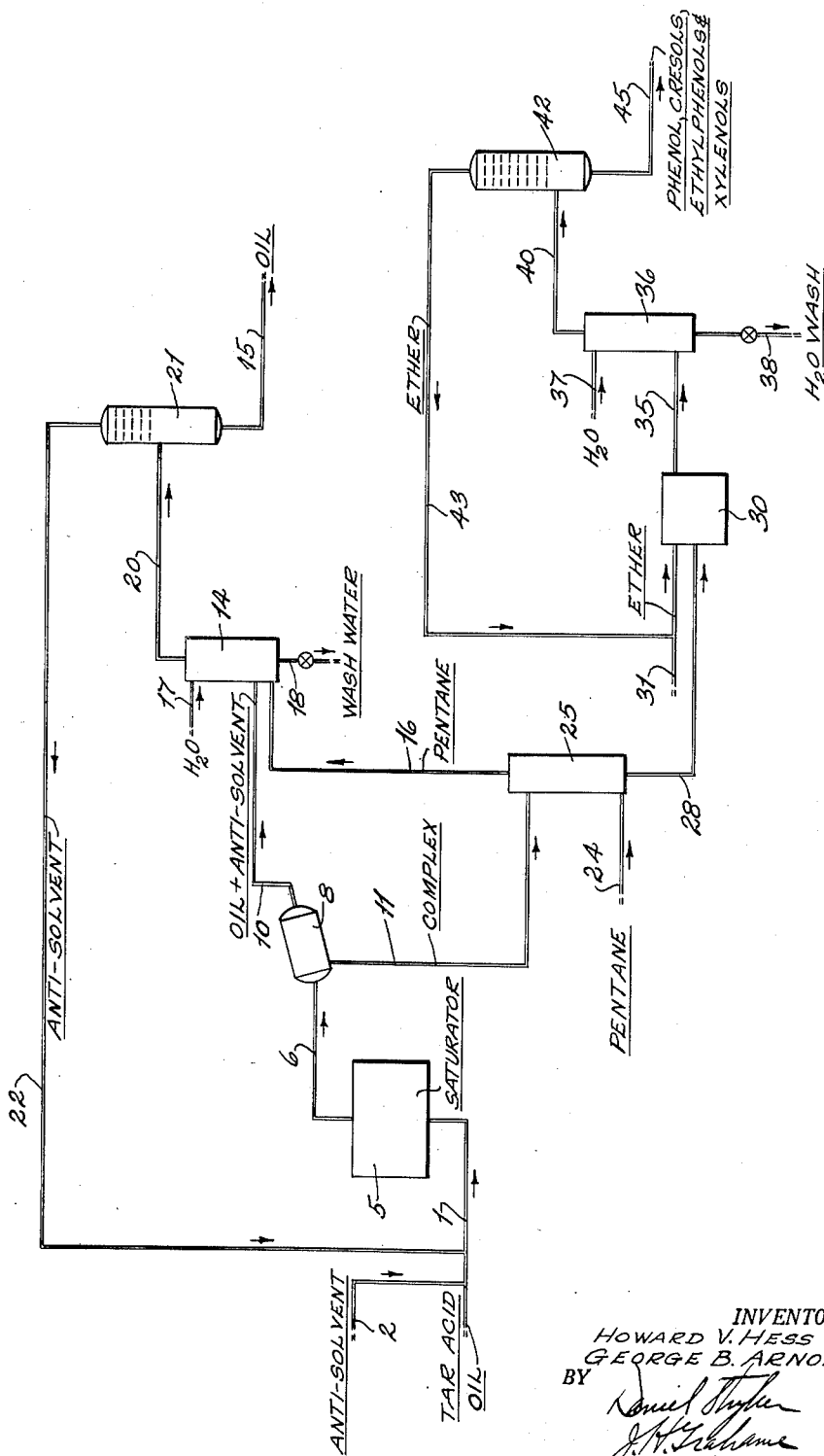

2,618,665

UNITED STATES PATENT OFFICE 2,618,665

PROCESS FOR ISOLATING PHENOLIC COMPOUNDS FROM MIXTURES THEREOF

Howard V. Hess, Beacon, and George B. Arnold, Glenham, N. Y., assignors to The Texas Company, New York, N. Y., a corporation of Delaware Application July 29, 1950, Serial No. 176,662

15 Claims. (Cl. 260—621)

This invention relates to a novel process for isolating phenolic compounds from mixtures thereof. It is particularly concerned with the isolation of phenol, cresols, ethylphenols and xylenols from aromatic mixtures, such as coal tar, which are commercial sources of such compounds.

In accordance with the process of this invention, phenol, cresols, ethylphenols and xylenols are separated from a crude mixture, wherein they are associated with higher phenolic compound and non-phenolic compounds, by contact with solid hexamethylene tetramine, whereby complexes are formed between hexamethylene tetramine and phenol, cresols, ethylphenols and xylenols. Separation of the complexes from the mixture is effected in the presence of an anti-solvent which is preferably a light aliphatic hydrocarbon, such as pentane. In the presence of an anti-solvent the hexamethylene tetramine contacted mixture separates into two liquid phases, the upper phase comprising crude aromatic mixture whose content of phenol, cresols, ethylphenols and xylenols has been reduced, and the lower phase consisting mainly of complex. Decomposition of the separated liquid complex phase is effected by contact with an oxygenated hydrocarbon solvent such as ether whereby phenol, cresols and xylenols are extracted out of the complex and hexamethylene tetramine crystallizes out in solid form.

Contact of the crude aromatic mixture with solid hexamethylene tetramine is ordinarily effected at atmospheric temperature, but the upper allowable temperature limit is approximately 180° F. Decomposition of the complex with an ether solvent is effected also at temperatures below 180° F. The phenol, cresols, ethylphenols and xylenols recovered by ether extraction of the liquid complex are of a high degree of purity and can be used without further treatment in the manufacture of resins. The hexamethylene tetramine recovered on complex decomposition with ether is recycled to contact further quantities of crude aromatic mixtures.

Phenol, cresols and xylenols are important chemicals of commerce and are widely used in manufacture of resins, dyes, pharmaceuticals and petroleum additives. In recent years the synthetic resin industry has been responsible for an ever increasing demand for phenol, cresols and xylenols to be used in phenolic resins. At the present time the largest source of phenol, cresols and xylenols is coal tar from which over 100 million pounds per year of aromatic hydroxy compounds are obtained. Other potential sources of these low molecular weight phenolic compounds are as follows: the tar produced from by-product coke ovens which contains about 2 to 4 per cent tar acids is a potential source of over 100 million pounds per year of phenolic-type compounds; the tar produced in city gas plants is another potential source of 7 million pounds per year of phenolic-type compounds; shale oil also has a considerable content of phenolic compounds; oils produced by coal hydrogenation and low temperature carbonization are additional potential sources of phenolic compounds.

At the present time isolation of phenolic compounds from coal tar and from other sources is effected by extraction with solvents; solutions of caustic soda, of sodium carbonate and of sodium sulfide, aqueous alcohol, formic acid solution, pyridine sulfate solution, are examples of solvents employed in recovery of phenolic compounds. All of these extraction processes involve the use of elaborate equipment and most of them are accompanied by a substantial consumption of chemicals. In general, these extraction processes are very unsatisfactory for separating phenol from oils of low phenol content. In addition, solvent extraction processes do not effect good separation of phenols from aromatic oils. Most of the extraction processes have the inherent difficulty that they leave a small amount of aromatic oil in the tar acid concentrate.

The process of this invention provides an effective means for isolating low molecular weight phenolic compounds, namely, phenol, cresols, ethylphenols, and xylenols, from crude mixtures of both high and low phenolic content. In addition, phenol, cresols, ethylphenols and xylenols may be separated from higher molecular weight aromatic hydroxy compounds by the process of this invention. The fact, that the phenols, cresols, ethylphenols and xylenols recovered by the complexing technique of this invention may be immediately used in resin manufacture, makes this invention of paramount importance in commercial production of phenols.

It is known that hexamethylene tetramine forms solid complexes with aromatic compounds containing one or more hydroxy groups attached to an aryl nucleus. However, when crude mixtures of phenolic compounds were contacted with hexamethylene tetramine, solid complex formation did not occur. Only when an aromatic fraction containing predominantly phenol alone is used does solid complex formation result. Accordingly, despite the specificity of hexamethylene tetramine as a complexing agent for phenolic compounds, it has not been possible to take advantage of this complexing action in separating phenolic compounds from crude mixtures containing a variety of phenolic compounds. The process of this invention utilizing the discovery that crude mixture contacted with hexamethylene tetramine is resolved into 2 liquid phases in the presence of an anti-solvent provides a commercial process for separating phenol, cresols, ethylphenols and xylenols from crude mixtures such as coal tar distillates.

Only low molecular weight phenolic compounds may be separated from crude aromatic mixtures in accordance with the process of this invention. Phenol itself and phenolic compounds up to and including those homologs containing aliphatic constituents equivalent to 2 methyl groups are separable from aromatic mixtures by the process of this invention. Accordingly, phenol itself, the cresol isomers, xylenol isomers and ethylphenol isomers are separated from aromatic mixtures in accordance with the process of this invention. The recited phenolic compounds are by far the most important commercial phenols. Apparently the presence of an anti-solvent does not effect separation of hexamethylene tetramine complexes of higher phenols from the crude mixture.

An outstanding feature of the process of this invention is that the presence of an anti-solvent during the resolution of the mixture which has been contacted with solid hexamethylene tetramine results in the formation of a two phase liquid system which is simply separated into complex phase and crude mixture of reduced phenol content. The process, therefore, does not necessitate the use of filtration techniques, centrifugal separators or time-consuming settling operations to effect complex separation from the crude mixture.

Another advantage of the process of the invention is that there is substantially no loss of complexing agent since crystalline hexamethylene tetramine obtained on decomposition of the liquid phase complex by ether contact may be used to contact further quantities of crude aromatic mixture.

Contact of the aromatic phenolic compound-containing mixture with solid hexamethylene tetramine is readily effected. Practically any vessel adapted for solid-liquid contact may be employed to effect the required contact. For example, crude aromatic mixture can be simply passed through a bed of crystalline hexamethylene tetramine with resulting formation of complex which is removed from the contact zone together with crude mixture. A simple saturator drum may also be employed to effect the necessary contact between the crude mixture and the solid hexamethylene tetramine. Agitators and mixing vessels equipped with stirring devices may also be employed to effect contact of the crude mixture with solid hexamethylene tetramine, but it is ordinarily not necessary to resort to mixing means.

The complexing agent employed in the process of this invention is hexamethylene tetramine, a well-known and commercially available condensation product of formaldehyde and ammonia. Hexamethylene tetramine is employed medicinally under the name of Urotropin.

The anti-solvent whose presence allows separation of a liquid complex layer from the crude aromatic mixture is paraffinic hydrocarbon which is advantageously an aliphatic hydrocarbon contains 3 to 10 carbon atoms. When normal gaseous aliphatic hydrocarbons, such as propane and butane, are employed as anti-solvents it is necessary to employ a pressure system. Pentanes and hexanes are particularly preferred anti-solvents since they are normally liquid and are easily recovered from the aromatic mixture. Naphthenes such as cyclohexene and cyclopentane may also be employed as anti-solvents. Mixtures of paraffinic hydrocarbons such as straight run naphtha and petrol ether may also be employed as the anti-solvent.

Ordinarily an equal volume of anti-solvent is added to the aromatic mixture. However, the volume ratio of anti-solvent to crude aromatic mixture may vary between 0.5 and 5 depending upon the concentration of phenolic compounds initially present in the aromatic mixture. In general, if the crude aromatic mixture contains a high percentage of phenolic compounds, volume ratios of anti-solvent to crude aromatic mixture in the lower portion of the range of 0.5 to 5 may be employed whereas higher volume ratios are employed when the phenolic content of the tar acid oil is relatively low. For most purposes equal volumes give excellent results.

There are two modifications of the process of this invention, both of which result in equally good removal of phenols, cresols, xylenols and ethyl phenols from organic mixtures. The preferred modification involves addition of anti-solvent to the aromatic mixture prior to its contact with solid hexamethylene tetramine. In this modification the effluent from the contacting zone is a two-phase liquid system which is readily separated into anti-solvent solution of aromatic mixture and complex phase.

The second modification involves addition of anti-solvent to the aromatic mixture after it has been contacted with solid hexamethylene tetramine. In this instance the effluent from the solid contacting zone is a uni-phase system which is resolved into two liquid phases by the addition of anti-solvent thereto.

The preferred modification effects greater removal of low molecular weight phenols of the described type in a once-through operation because the constant displacement of complex into a separate phase allows greater complex formation in a given period of time. However, good results were obtained with the alternative modification since the important factor in the process of this invention is the presence of anti-solvent during the separation of the complex phase from the aromatic mixture.

The liquid complex phase separated from the aromatic mixture in the presence of an anti-solvent comprises from 50 to 80 weight per cent phenolic compounds. The average phenolic compound content of the complex is in the neighborhood of 60 to 70 per cent. The high phenol content of the complex phase illustrates the efficiency of the process of this invention and makes the process very attractive from a commercial point of view.

The high phenolic compound content of the complex phase results from the high combining power of hexamethylene tetramine with phenolic compounds. As an illustration one molecule of hexamethylene tetramine complexes with three molecules of phenol.

Contact of crude aromatic mixture either with or without anti-solvent must be effected at a temperature below 180° F. because phenol-formaldehyde resins are formed by reaction between hexamethylene tetramine and phenols at temperatures higher than 180° F. Temperatures between 50 and 180° F. may be used for complex formation, but ordinarily the contact of aromatic mixture and solid hexamethylene tetramine is effected at temperatures between 60 and 120° F.

Formation of the complexes and separation of the liquid complex phase from the aromatic mixture are apparently not affected by pressure changes. Atmospheric pressure is ordinarily employed in the process of the invention, but both sub-atmospheric and super-atmospheric pressures may be employed. Super-atmospheric pressures are usually employed when the anti-solvent is a normally gaseous hydrocarbon, such as propane or butane.

The aromatic oil or anti-solvent solution of aromatic oil is ordinarily contacted with solid hexamethylene tetramine under conditions which will assure saturation of the oil phase. If the aromatic oil or anti-solvent solution thereof is passed through a solid bed of hexamethylene tetramine, a residence time of approximately 10 to 20 minutes is usually adequate to assure saturation of the oil phase.

The separated liquid complex phase is ordinarily subjected to a wash with a solvent to remove entrained phenolic compounds and non-phenolic aromatic components from the complex phase. The wash solvent is advantageously the compound that is used as the anti-solvent.

It is also recommended that the ether extract solution containing low molecular weight phenols obtained in the decomposition of the complex be subjected to an aqueous wash to remove residual complex and hexamethylene tetramine therefrom prior to removal of the ether by heat stripping. This water washing removes complex and prevents resin formation on heat stripping the ether from the phenolic compounds.

It is advisable to water wash the anti-solvent solution of aromatic mixture separated from the liquid complex phase prior to removal of anti-solvent therefrom. This water wash also serves to remove residual complex and hexamethylene tetramine from the anti-solvent solution and obviates resin formation during recovery of the anti-solvent.

Decomposition of the complex phase may be effected with oxygenated compounds such as ethers and cyclic ethers and in general with those oxygenated solvents which have a high solvent power for tar acids and a low solvent power for hexamethylene tetramine and for water. In addition, water is a suitable solvent for decomposition of the complex if the tar acids involved in the complex are substantially insoluble in water. Since water decomposes the complex by dissolving the hexamethylene tetramine portion thereof, it is apparent that it may only be employed where the complex phase comprises substantially water insoluble phenols such as xylenols and ethylphenols. Particularly preferred solvents are diethyl ether and tetrahydro furane.

Decomposition of the complex by contact with an ether or water is effected at temperatures below 180° F. in order to avoid resin formation. The usual temperatures employed for complex decomposition are in the range of 50 to 120° F. Since there is no advantage to employing higher temperatures for complex decomposition, it is ordinarily effected at atmospheric temperature.

In the accompanying drawing there is diagrammatically outlined a preferred modification of this invention wherein an anti-solvent solution of feed oil is contacted with solid hexamethylene tetramine.

Tar acid oil obtained from coal tar distillation and containing approximately 50 weight per cent tar acids is mixed in pipe 1 with an equal volume of pentane anti-solvent which is obtained through a pipe 2. The resulting mixture is introduced into a contacting zone 5 wherein it is contacted with solid hexamethylene tetramine. The contacting zone 5 can be a saturator drum or it can be a mixing vessel equipped with a stirring means. Contact of the pentane solution of tar acid oil with solid hexamethylene tetramine results in the formation of hexamethylene tetramine complexes of phenol, cresols, xylenols and ethylphenols.

There is removed from the contacting zone 5 through a pipe 6 a two-phase liquid which is introduced into a separator 8. In the separator 8 the liquid effluent is separated into two phases. The upper phase comprising pentane solution of tar acid oil from which phenol, cresols, ethylphenols and xylenols have been substantially removed is withdrawn from the separator 8 through a pipe 10. The lower phase comprising liquid complexes of hexamethylene tetramine and low molecular weight phenolic compounds is withdrawn from the separator 8 through a pipe 11.

The pentane solution of tar acid oil is introduced into a wash tower 14. The pentane wash obtained by washing the complex phase, which operation will be described later, is also introduced into the wash tower 14 through a pipe 16. In the wash tower 14 the pentane solution of tar acid oil is subjected to countercurrent contact with water which is introduced therein through a pipe 17. The water extraction removes residual hexamethylene tetramine and complex from the pentane solution prior to heat stripping of pentane therefrom. This wash operation prevents resin formation in the stripping tower. The water wash containing extracted hexamethylene tetramine and complex is removed from the wash tower 14 through a pipe 18 to a hexamethylene tetramine recovery system, not shown, which comprises a reduced pressure stripper.

Water-washed pentane solution of tar acid oil is removed from the wash tower 14 through a pipe 20 and is introduced into a stripping tower 21 wherein pentane is removed from the tar acid oil. Pentane is taken off overhead through a pipe 22 and is recycled therethrough to combine with further quantities of crude tar acid oil.

There is withdrawn from the bottom of the stripping tower 21 through a pipe 15 tar acid oil from which phenols, cresols, xylenols and ethylphenols have been substantially extracted and whose total tar acid content is approximately 10 per cent. If further removal of low molecular weight phenolic compounds from this tar acid oil is desired, it can be recycled to the contacting zone 5. However, the tar acid content can not be lowered below approximately 5 per cent because the process of this invention does not remove high molecular weight phenols. This tar acid oil containing approximately 10 weight per cent tar acids is an excellent wood preservative.

Returning to the complex phase which is withdrawn from the separator 8 through a pipe 11, it is introduced thereby into a wash tower 25 wherein it is subjected to wash with pentane which is introduced to the tower 25 through 24.

Pentane washing of the complex phase removes aromatic oil therefrom. The pentane wash is removed from the wash tower 25 through a pipe 16 and is introduced into the wash tower 14 wherein water washing of the pentane solution of tar acid oil is effected as previously described.

There is withdrawn from the bottom of the wash tower 25 through a pipe 28 a complex phase which is introduced into an extraction zone 30 wherein it is subjected to contact with diethyl ether which is introduced therein through a pipe 31. Contact of the complex phase with ether results in decomposition of the complex with precipitation of solid hexamethylene tetramine and dissolution of the low molecular weight phenols in ether. The extraction zone 30 may also be in the form of a separator drum or a mixing vessel equipped with stirring means. In addition, after a substantial amount of crystalline hexamethylene tetramine has accumulated in the extraction zone 30, it may be employed as a contacting zone wherein initial contact of pentane solution of tar acid oil and solid hexamethylene tetramine is effected. In this instance the contacting zone 5 can be employed as the extraction zone while the extraction zone 30 serves as the contacting zone. Another alternative flow not shown would involve the use of the extraction zone 30 after it had accumulated a substantial amount of solid hexamethylene tetramine as a pre-contacting zone for pentane solution of hexamethylene tetramine; this type operation would require the use of two vessels which would alternate as extraction and precontacting zones. These alternatives are not shown in the diagrammatic sketch because they are regarded as engineering expedients.

There is withdrawn from the extraction zone 30 an ether solution of low molecular weight phenols which is introduced through a pipe 35 into a wash tower 36 wherein the ether solution is subjected to countercurrent washing with water which is introduced into the tower 36 through a pipe 37. Water washing of the ether solution of low molecular weight phenols results in removal of dissolved hexamethylene tetramine and complex therefrom. The water wash contains approximately 1–2 per cent hexamethylene tetramine and is passed to a reduced pressure stripper for recovery of hexamethylene tetramine.

The water-washed ether solution of low molecular weight phenols is introduced through a pipe 40 into a fractionating tower 42 wherein ether is distilled from the low molecular weight phenols. Ether is taken off overhead from the tower 42 through a pipe 43 and is recycled through the pipe 31 to the extraction zone 30 for further complex decomposition.

Low molecular weight phenols of over 99.5 per cent purity are withdrawn from the fractionating tower 42 through a pipe 45. Phenol, cresols, xylenols and ethylphenols are included in this fraction which can be resolved into individual components by fractional distillation.

The following example illustrates the process of this invention for recovering phenol, cresols, xylenols and ethylphenols from crude aromatic mixtures.

1000 bbl. of tar acid oil containing 49.4 weight per cent tar acids and 3.2 weight per cent water is diluted with 2000 bbl. pentane, then contacted at a residence time of 10 minutes with solid hexamethylene tetramine in a stirred vessel. An oil rich and a complex rich phase are produced and separated in a decanter. The complex rich phase is washed with pentane and the pentane washings are combined with the oil rich phase and stripped free from pentane to yield 584 bbl. of aromatic oil containing 8.6 weight per cent tar acids. Analysis of the tar acids left in the oil revealed that they have a molecular weight of 148, indicating that they have higher molecular weight than xylenol.

The washed complex rich phase comprising 560 bbl. is treated with 1000 bbl. of ether and 14.5 tons of solid hexamethylene tetramine is precipitated. The ether extract, after water washing, yields 384 bbl. of tar acid concentrate which analysed better the 99.5 weight percent tar acids.

It is apparent from the foregoing example that excellent separation of low molecular weight phenols from crude tar acid oil is obtained by the process of this invention. The tar acid content of the tar acid oil is reduced from 49.4 weight percent to 8.6 weight percent by once-through operation and the residual tar acids in the treated oil are predominantly phenolic compounds having molecular weights higher than xylenol. Another outstanding feature of the invention is illustrated by the better than 99.5 percent purity of the low molecular weight tar acids isolated from the crude mixture of the process of this invention.

Obviously, many modifications and variations of the invention as hereinbefore set forth may be made without departing from the spirit and scope thereof, and, therefore, only such limitations should be imposed as are indicated in the appended claims.

We claim:

1. A process for isolating low molecular weight phenolic compounds of the group consisting of phenol, cresols, ethylphenols and xylenols from a phenolic compound-containing crude mixture which comprises contacting said mixture with solid hexamethylene tetramine at a temperature below 180° F. whereby there are formed complexes of said hexamethylene tetramine with said low molecular weight phenolic compounds, effecting separation of said hexamethylene tetramine-contacted mixture in the presence of an anti-solvent selected from the group consisting of paraffinic and naphthenic hydrocarbons and mixtures thereof into two phases, the upper phase comprising solution of anti-solvent and crude mixture and the lower phase comprising complex, and decomposing said separated complex phase by contact with an oxygenated hydrocarbon solvent having a high solvent power for tar acids and a low solvent power for hexamethylene tetramine and water at a temperature below 180° F. into crystalline hexamethylene tetramine and solution of said low molecular weight phenols.

2. A process according to claim 1 in which contact of the crude mixture with solid hexamethylene tetramine and decomposition of complex are effected at a temperature between 50 and 120° F.

3. A process according to claim 1 in which the anti-solvent is a paraffinic hydrocarbon containing 3 to 10 carbon atoms.

4. A process according to claim 1 in which the anti-solvent is a pentane fraction.

5. A process according to claim 1 in which decomposition of complex is effected with an ether.

6. A process for isolating low molecular weight phenolic compounds of the group consisting of phenol, cresols, ethylphenols and xylenols from a phenolic compound-containing crude mixture which comprises diluting said mixture with a paraffinic hydrocarbon anti-solvent, contacting said diluted mixture with hexamethylene tetramine at a temperature between 50 and 120° F. whereby there are formed complexes of said hexamethylene tetramine with said low molecular weight phenolic compounds, effecting separation of said hexamethylene tetramine-contacted diluted mixture into two phases, the upper phase comprising solution of anti-solvent and crude mixture and the lower phase comprising complex, and decomposing said separated complex by contact with an oxygenated hydrocarbon solvent having a high solvent power for tar acids and a low solvent power for hexamethylene tetramine and water at a temperature below 180° F. into crystalline hexamethylene tetramine and solution of said low molecular weight phenols.

7. A process according to claim 6 in which the crude mixture is diluted with an equal mixture of paraffinic hydrocarbon anti-solvent.

8. A process according to claim 6 in which the crude mixture is tar acid oil.

9. A process according to claim 6 in which complex is decomposed with an ether.

10. A process for isolating low molecular weight phenolic compounds of the group consisting of phenol, cresols, ethylphenols and xylenols from a phenolic compound-containing crude mixture which comprises contacting said mixture with solid hexamethylene tetramine at a temperature between 50 and 120° F. whereby there are formed complexes of said hexamethylene tetramine with said low molecular weight phenolic compounds, diluting said hexamethylene tetramine-contacted mixture with a paraffinic hydrocarbon anti-solvent whereby two phases are formed, the upper phase comprising solution of anti-solvent and crude mixture and the lower phase comprising complex, separating said phases and decomposing said separated complex phase by contact with an ether solvent at a temperature between 50 and 120° F. into crystalline hexamethylene tetramine and solution of said low molecular weight phenols.

11. A process according to claim 10 in which the hexamethylene tetramine-contacted mixture is diluted with an equal volume of anti-solvent.

12. A process according to claim 10 in which decomposition of the complex is effected with an aliphatic ether.

13. A process for isolating low molecular weight phenolic compounds of the group consisting of phenol, cresols, ethylphenols and xylenols from a phenolic compound-containing crude mixture which comprises contacting said mixture with solid hexamethylene tetramine at a temperature below 180° F., whereby there are formed complexes of said hexamethylene tetramine with said low molecular weight phenolic compounds, effecting separation of said hexamethylene tetramine-contacted mixture in the presence of an anti-solvent selected from the group consisting of paraffinic and naphthenic hydrocarbons and mixtures thereof into two phases, the upper phase comprising solution of anti-solvent and crude mixture and the lower phase comprising complex, and decomposing said separated complex phase by contact with an ether solvent at a temperature below 180° F. into crystalline hexamethylene tetramine and solution of said low molecular weight phenols, and recovering said low molecular weight phenols from said solution.

14. A process for freeing a phenolic compound-containing hydrocarbon mixture of low molecular weight phenolic compounds of the group consisting of phenol, cresols, ethylphenols and xylenols which comprises contacting said mixture with solid hexamethylene tetramine at a temperature below 180° F. whereby there are formed complexes of said hexamethylene tetramine and said low molecular weight phenolic compounds, separating a liquid complex phase from said mixture in the presence of an anti-solvent selected from the group consisting of a paraffinic and naphthenic hydrocarbons and mixtures thereof to leave a hydrocarbon-antisolvent solution and removing antisolvent from said solution to yield a hydrocarbon fraction substantially free of said low molecular weight phenols.

15. A process for separating low molecular weight phenolic compounds of the group consisting of phenol, cresols, ethylphenols and xylenols from a phenolic compound-containing mixture which comprises contacting said mixture with solid hexamethylene tetramine at a temperature below 180° F. whereby there are formed complexes of said hexamethylene tetramine and said low molecular weight phenolic compounds, separating a liquid complex phase from said mixture in the presence of an antisolvent selected from the group consisting of paraffinic and naphthenic hydrocarbons and decomposing said separated complex phase by contact at a temperature below 180° F. with a solvent selected from the group consisting of water and an oxygenated hydrocarbon having a high solvent power for tar acids and a low solvent power for hexamethylene tetramine and water whereby said low molecular weight phenols are liberated from said complex.

HOWARD V. HESS.
GEORGE B. ARNOLD.

REFERENCES CITED

The following references are of record in the file of this patent:

UNITED STATES PATENTS

| Number | Name | Date |
|---|---|---|
| 1,955,023 | Roos et al. | Apr. 17, 1934 |
| 2,149,322 | Tuttle | Mar. 7, 1939 |
| 2,310,616 | Cislak et al. | Feb. 9, 1943 |
| 2,499,820 | Fetterly | Mar. 7, 1950 |

OTHER REFERENCES

Harvey et al., Jour. Ind. Eng. Chem., vol. 13, pp. 135–41 (1921).